United States Patent [19]

Gold

[11] Patent Number: 4,939,879
[45] Date of Patent: Jul. 10, 1990

[54] WINDOW SEALING STRIP FOR AUTOMOTIVE VEHICLES

[76] Inventor: Peter N. Gold, 465 N. Wood Rd., Rockville Centre, N.Y. 11570

[21] Appl. No.: 311,134

[22] Filed: Feb. 15, 1989

[51] Int. Cl.$^5$ .............................. F06L 3/62; B60J 1/02
[52] U.S. Cl. ........................................ 52/208; 52/397; 296/93
[58] Field of Search .................... 52/208, 397, 400; 296/93, 840, 201

[56] References Cited

U.S. PATENT DOCUMENTS

| | | | |
|---|---|---|---|
| 3,155,422 | 11/1964 | Campbell et al. | 52/208 X |
| 3,416,833 | 12/1968 | Griffin | 52/208 X |
| 3,434,903 | 3/1969 | Hann | 52/208 X |
| 3,478,475 | 11/1969 | Strack | 52/208 |
| 3,478,476 | 11/1969 | Kemp | 52/208 |
| 3,981,113 | 9/1976 | Griffin | 52/208 |
| 4,674,247 | 6/1987 | Hayashi et al. | 52/208 |
| 4,787,187 | 11/1988 | Feldman | 52/397 |

Primary Examiner—Richard E. Chilcot, Jr.
Attorney, Agent, or Firm—Collard, Roe & Galgano

[57] ABSTRACT

A rubber sealing strip for use in conjunction with a curable adhesive for retaining an automotive window on a flange body pael in an automotive vehicle body has a cross section which allows improved retention of the window on the vehicle body. A flange on the flange body panel has an outer surface on which the window is retained by the curable adhesive. The rubber sealing strip has a first surface engaging an inner surface of the window and a second surface, opposite the first surface, engaging the flange. The first window engaging surface is wider than the second surface engaging the flange. The sealing strip has first and second side surfaces extending between the first and second surfaces forming a generally triangular cross-section. Upon assembly of the window to the flange, the sealing strip deforms in a manner wherein only a limited area of the flange is covered.

3 Claims, 1 Drawing Sheet

WINDOW SEALING STRIP FOR AUTOMOTIVE VEHICLES

BACKGROUND OF THE INVENTION

1. Field of the Invention

This invention relates to an improved rubber sealing strip for use in a system for retaining windows on automotive vehicles. More particularly, it relates to an improved rubber seal, which can be used in conjunction with standard urethane retention systems.

2. Description of the Prior Art

It is desirable to have not only one, but two, retention systems to hold automotive windshields in place which simultaneously use the same curable urethane seal. Such a system is disclosed in applicant's co-pending application, Ser. No. 194,883, now U.S. Pat. No. 4,805,363, and discloses how a curable urethane seal can be applied and contained not only on the top of a vehicle window flange, but through the flange, to the other side thereof facing the interior of the vehicle. Unfortunately, even with this double retention system, water leakage occurs between the glass panel and the flange, as well as the outer vehicle flange.

Professionals in the automotive glass replacement industry understand this and, in fact, have, and are, using a third method to add retention and sealing to the glass panel prior to applying it to the vehicle flange, such as when replacing a windshield. Use is made of butyl rubber tape applied continuously around the inside of the glass panel. The tape is supplied as a roll with the butyl tape having a specific configuration. This rubber tape acts as a dam to raise the glass panel above the flange for the addition of curable sealant and actually molds the curable sealant to the inner surface of the glass panel and flange. Such a system is shown in U.S. Pat., No. 4,165,119. In addition, the butyl rubber strip acts as a secondary primary retention device to retain the glass panel to the flange. This is especially important, since aftermarket customers often wish to utilize the vehicle immediately after a new windshield is installed and prior to the urethane fully curing. The butyl rubber is tacky and malleable so that it may be compressed forming not only a dam, but also producing an adhesive force bonding the windshield to the outer surface of the vehicle flange. Using this butyl tape, it is possible for the consumer to actually drive the vehicle away "immediately" after the glass replacement is completed. This is highly desirable, especially in the automotive glass aftermarket.

Using butyl tape, however, in the shape (circular, square, rectangular) as now commercially available to those in the auto glass replacement market, has a major disadvantage in that the actual structural strength of the primary urethane retention system is reduced from that originally present when the automotive glass was installed by the vehicle manufacturer. This is because butyl rubber tape has a retention strength of 35 pounds per square inch, whereas the retention strength of the cured urethane sealant is over 900 pounds per square inch. Thus, every square inch of butyl tape applied to a replacement window in an area that originally had been covered with urethane sealant results in a reduction of structural strength by approximately 870 pounds per square inch. The main problem with the currently available butyl rubber shapes is that when they are placed between the glass panel and the vehicle flange, they expand outwardly covering much of the area between the glass panel and the flange. Therefore, it can be easily understood that even when butyl tape is used by professionals in the auto glass replacement industry, the retention strength of the glass system is not the same as originally produced during the vehicle manufacture, but is significantly less, due to the lost bonding area for the urethane.

It should be noted that approximately six million automotive windshields are replaced every year. One recommended method for replacing these windshields utilizes 3M company butyl rubber sealer, Part No. 08631, which is a square 5/16" on a side. The length of a typical automotive flange or pinchweld is approximately 0.75 inch. Therefore, approximately 50 percent of the bonding area is lost. While 3M recommends a minimum of ¼" of the flange to be bonded to the window panel with Super Fast Urethane Sealant, Part No. 08609, such a dimension greatly reduces the bonding force between the windpanel and the vehicle flange from that originally present when the vehicle left the factory.

Since the butyl rubber tape utilized in the glass replacement industry is necessary if the vehicle is to be used immediately after window replacement, it has been found that a specific configuration of the butyl tape is advantageous in simultaneously producing a sufficient bond to hold the replacement window on the vehicle until the urethane sealant has cured. This configuration supports the weight of the glass panel and at the same time provides enough initial retention strength to retain the glass panel but without deforming to cover as large an area as the presently available butyl strips. This configuration also allows for a bonding area of urethane sealant between the flange on the vehicle body and the inner side of the window, which is only slightly less than the bonding area utilized during vehicle manufacture.

The use of butyl rubber tape also has several other advantages over a retention system that solely uses urethane. It has been found that the constant resiliency and retention strength of butyl tape seals out acid rain, rain, and humidity. Also, it is less likely to lift off paint from the primer, which commonly occurs because of the torsional bending movement of the glass panels using curable sealant, which is relatively stiff after curing. Thus, the butyl rubber tape is highly advantageous in allowing a glass panel to utilize the resiliency of the butyl tape to absorb and accommodate torsional and bending loads thereon during vehicle operation. When used in combination with urethane, butyl tape can, in fact, reduce the cracking in laminated safety glass from inner surface stone chips that often occur on the outer surface of a vehicle windshield. Because the butyl rubber tape remains resilient, the amplitude of the flexing of the windshield during operation is reduced. This is particularly important on thinner laminated glass, which is now being used in many automotive windshields, as compared to the thicker, heavier glass previously used.

The use of butyl tape also reduces what is known in the art as "expansion rust cracking" of glass via the expansion of rust from the vehicle flange to the butyl sealant. Of course, the rust expansion is actually absorbed and accommodated by the resilient butyl tape. Consequently, as the rust bulges outwardly toward the glass window, the force produced is absorbed by the butyl tape.

Heretofore, butyl tape has been configured as an extruded square, an extruded rectangle, or an extrusion having a circular cross section. It has been found that by using the cross section of the present invention, the desirable properties discussed above are produced and enhanced. A bonding area between the glass panel and the vehicle flange being acted upon by the urethane sealant is produced which closely approximates that of the original urethane seal produced during vehicle manufacture. It has been found that the stress related cracking of laminated safety glass panels is reduced when the combination of the urethane sealant and the configuration of butyl tape is reduced, both in the short term and over the life of the vehicle. In addition, other advantages result from the use of butyl tape, such as reduced frequency of water leaks, making it easier to vary the spacing, marginal rust perforation repairs, with or without replacing portions of the flange.

SUMMARY OF THE INVENTION

It is an object of the invention to provide an improved retention system for automotive vehicle glass panels.

It is yet another object of the invention to provide an improved retention system for use in the autmotive aftermarket, utilizing a butyl rubber sealing strip having a unique cross section.

It is yet an additional object of the invention to provide a butyl rubber sealing strip, which is economical to manufacture, easy to utilize in conjunction with conventional window retention systems, and which produces a stronger and superior joint between the window and the vehicle.

Accordingly, these and related objects are achieved by a rubber sealing strip, which is used in conjunction with a curable adhesive retaining automotive window panel on a flange body panel of an automobile body. A flange on the flange body panel has an outer surface on which the window panel is retained by the curable adhesive. The rubber sealing strip has a surface engaging an inner surface of the window panel and a surface opposite this surface for engaging the flange.

The sealing strip has a generally triangular cross-section with a flat side forming the surface engaging the inner surface of the window panel and the apex of paint of the triangle, opposite the flat surface engaging the glass. The apex deforms forming the surface engaging the flange. The sealing strip has first and second side surfaces extending between the first and second surfaces which meet at the apex of the generally triangular sealing strip. The contact surface formed by the apex engages the top or outer surface of the flange and deforms upon assembly. This deformation causes a contact area to be produced which is sufficient to provide temporary retention but is limited in that an area similar to that used during initial assembly is allowed for bonding the urethane to the window panel and the flange on the body panel.

These and other objects and advantages of the present invention will become apparent from the following description of the accompanying drawing, which discloses one embodiment of the invention. It is to be understood that the drawing is to be used for purposes of illustration only, and not as a definition of the invention.

BRIEF DESCRIPTION OF THE DRAWING

Further advantages and details can be gleaned from the drawing wherein similar reference numerals denote similar elements throughout the several views.

DESCRIPTION OF THE PREFERRED EMBODIMENT

Figure 1:
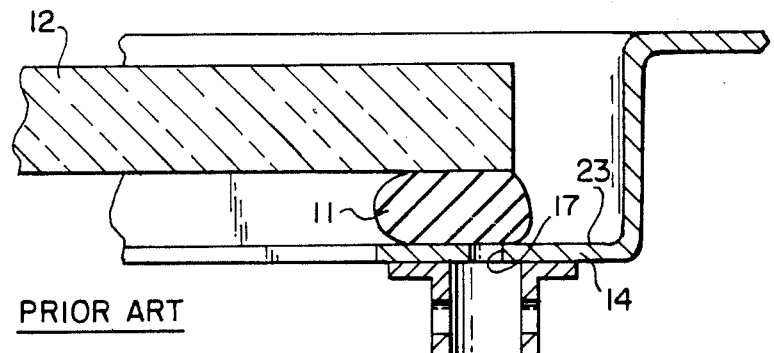
FIG. 1 is a side elevation view, partially in cross-section, of the prior art window retention system using a circular butyl strip of the type presently available.

Referring to FIG. 1, there is shown a prior art mounting system as is used in the automotive aftermarket for replacing automotive windshields. This prior art system may use a circular butyl sealing strip 11 attached to a window panel 12. When sealing strip 11 is flattened against the window flange 14, it expands to cover a large area and may even cover the inlet to a receptable 15 placed on the lower side of flange 14 to fill with the urethane to thereby form a mechanical interlock. Such a receptable 15 is disclosed in the inventor's U.S. patent application, Ser. No. 194,833, now U.S. Pat. No. 4,805,363, the teachings of which are incorporated herein by reference. Receptable 15 communicates through hole 17 with the top surface 23 of flange 14.

Figure 2:
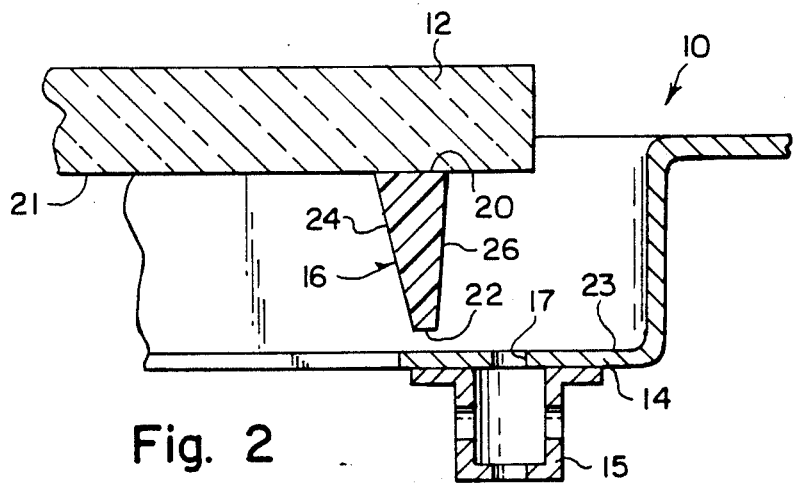
FIG. 2 is a side elevation view, partially in cross section, of the window retention system using the sealing strip of the present invention prior to assembly; and, FIG. 3 is a side elevation view, partially in cross section, of the retention system using the sealing strip of FIG. 2 after assembly.

Referring to FIG. 2, there is shown the mounting system of the present invention, generally denoted as 10, for mounting an automotive window 12 to a flange 14 of a motor vehicle. Mounting system 10 utilizes a rubber sealing strip 16 of the present invention. Sealing strip 16 is preferably formed from butyl rubber and has a unique, generally triangular cross section, in that a first surface 20 thereof is adapted to attach to an inside surface 21 of window 12. Strip 16 has an apex 22 opposite surface 20, adapted to contact inside surface 23 of the flange 14. Sealing strip 16 has a pair of side surfaces 24 and 26 oriented at a predetermined angle with respect to one another thus forming the triangle. This structure again utilizes receptable 15 which communicates with top surface 23 of flange 14 through hole 17.

Figure 3:
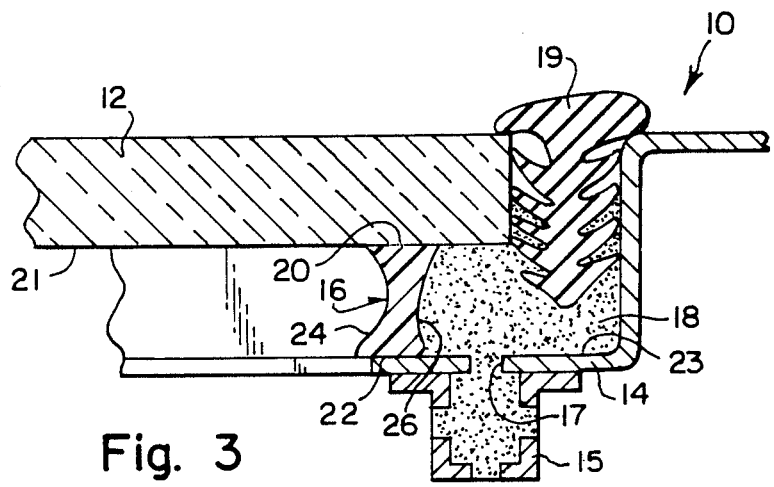

Referring to FIG. 3, there is shown the window mounting system 10, including the strip 16 in the assembled position with urethane sealant 18 and trim portion 19 disposed between window 12 and flange 14. Upon assembly, apex 22 contacts flange 14 and causes the lower portion of sides 24 and 26 adjacent apex 22 of sealing strip 16 to bulge outwardly, as shown in FIG. 3. However, first and second surfaces 20, 22 cover far less of top 23 surface of flange 14. Thus, the area of contact between urethane sealant 18 and top surface 21 of window 12 and inner surface 23 of flange 14 is equivalent to that of the window panel when it came from the factory. Also, hole 17 remains uncovered by deformed apex 22 so that the urethane may flow into receptacle 15. Clearly, other shapes for butyl rubber strips could be used, other than a triangle, as long as they cover surface 23 or flange 14 only to a limited extent after being comprised. It is preferred that after deformation the width of the surface of deformed apex 22 of sealing strip 16 contacting surface 23 is less than or equal to the width along surface 21 of window panel 12.

While only one embodiment and example of the present invention has been illustrated and described, it is obvious that many changes and modifications may be made thereunto, without departing from the spirit and scope of the invention.

I claim:

1. A rubber sealing strip of the type used in conjunction with a curable adhesive for spacing an automotive window panel from a flanged body panel of an automotive vehicle body retaining the window panel on the flanged body panel, a flange on the flanged body panel having an outer surface on which the window panel is retained by the curable adhesive, the rubber sealing strip having a surface engaging an inner surface of the window panel, the sealing strip comprising:
   a first surface forming the surface engaging an inner surface of the window panel;
   a second surface, opposite said first surface, forming the surface engaging the flange, said first surface having a width greater than said second surface;
   a midpoint between said first surface and said second surface;
   a first side surface extending from said first surface to said second surface;
   a second side surface extending from said first surface to said second surface at an angle with respect thereto, said first and second sides outwardly deformable upon engaging the flange; and
   wherein said second surface of said sealing strip engaging said flange bulges outwardly on deforming; and wherein said midpoint has less thickness than the thicknesss of said first surface and said second surface.

2. The rubber sealing strip, as set forth in claim 1, sealing strip has a generally triangular cross-section with a said second surface being the apex formed by interconnecting of the first and second sides.

3. A rubber sealing strip of the type used in conjunction with a curable adhesive for spacing an automotive window panel from a flanged body panel of an automotive vehicle body retaining the window panel on the flanged body panel, a flange on the flanged body panel having an outer surface on which the window panel is retained by the curable adhesive of the flange having a hole therein communicating with a cavity formed on an inner surface of the flange, the rubber sealing strip having a surface engaging an inner surface of the window panel, the sealing strip comprising:
   a first surface forming the surface engaging an inner surface of the window panel;
   a second surface, opposite said first surface, forming the surface engaging the flange, said first surface having a width greater than said second surface;
   a midpoint between said first surface and said second surface;
   a first side surface extending from said first surface to said second surface;
   a second side surface extending from said first surface to said second surface at an angle with respect thereto, said first and second sides outwardly deformable upon engaging the flange; and
   wherein said second surface of said sealing strip engaging said flange bulges outwardly on deforming; and wherein said midpoint has less thickness than the thickness of said first surface and said second surface.

* * * * *